(12) United States Patent
Kodeda

(10) Patent No.: US 8,020,396 B2
(45) Date of Patent: Sep. 20, 2011

(54) HEAT PUMP SYSTEM

(75) Inventor: Frans Kodeda, Kullavik (SE)

(73) Assignee: kodeda cleantec AB (SE)

( * ) Notice: Subject to any disclaimer, the term of this patent is extended or adjusted under 35 U.S.C. 154(b) by 422 days.

(21) Appl. No.: 12/085,087

(22) PCT Filed: Nov. 3, 2006

(86) PCT No.: PCT/SE2006/001248
§ 371 (c)(1),
(2), (4) Date: May 15, 2008

(87) PCT Pub. No.: WO2007/058576
PCT Pub. Date: May 24, 2007

(65) Prior Publication Data
US 2009/0255646 A1 Oct. 15, 2009

(30) Foreign Application Priority Data
Nov. 16, 2005 (SE) .................................. 0502512

(51) Int. Cl.
*F25B 27/00* (2006.01)
(52) U.S. Cl. ............................. 62/235.1; 62/238.7
(58) Field of Classification Search ............... 62/235.1, 62/186, 187, 271, 272, 324.1, 238.7; 454/162, 454/265, 141, 164; 165/45, 59, 121; 126/634, 126/621, 701, 628
See application file for complete search history.

(56) References Cited

U.S. PATENT DOCUMENTS

| | | | | |
|---|---|---|---|---|
| 4,066,118 A * | 1/1978 | Goettl | ........................... | 165/236 |
| 4,163,369 A * | 8/1979 | Owen | ........................... | 237/2 B |
| 4,196,595 A * | 4/1980 | Shaw | ........................... | 62/160 |
| 4,242,872 A * | 1/1981 | Shaw | ........................... | 62/235.1 |
| 4,378,787 A | 4/1983 | Fleischmann | | |
| 4,432,147 A * | 2/1984 | Chen et al. | ........................... | 34/542 |
| 4,462,390 A | 7/1984 | Holdridge et al. | | |
| 4,484,567 A | 11/1984 | Sikora | | |
| 4,497,311 A * | 2/1985 | Brandenburg, Jr. | ........................... | 126/606 |
| 4,498,526 A * | 2/1985 | Arenas | ........................... | 165/45 |
| 4,509,503 A | 4/1985 | Young | | |
| 4,951,480 A * | 8/1990 | Brence | ........................... | 62/304 |
| 4,967,729 A * | 11/1990 | Okumura | ........................... | 126/632 |
| 5,065,585 A * | 11/1991 | Wylie et al. | ........................... | 62/89 |
| 6,101,716 A * | 8/2000 | Schulz | ........................... | 29/890.033 |
| 2002/0117166 A1 * | 8/2002 | Okumura | ........................... | 126/633 |

FOREIGN PATENT DOCUMENTS

| | | |
|---|---|---|
| DE | 20311209 | 12/2003 |
| SU | 1206573 A1 | 1/1986 |
| SU | 1740904 A1 | 6/1992 |

OTHER PUBLICATIONS

PCT Application No. PCT/SE2006/001248, International Search Report mailed Feb. 13, 2007, 4 pgs.
PCT Application No. PCT/SE2006/001248, Written Opinion mailed Feb. 13, 2007, 4 pgs.
"Russian Application Serial No. 2008123818/06(028861), Official Action dated Oct. 21, 2010", (w/ English Translation), 5 pgs.

* cited by examiner

*Primary Examiner* — Mohammad M Ali
(74) *Attorney, Agent, or Firm* — Schwegman, Lundberg & Woessner, P.A.

(57) ABSTRACT

Embodiments of the invention relate to a heat pump system comprising a heat pump so arranged as to permit the taking up of thermal energy from outdoor air and the giving off of thermal energy to another medium, and an external space adapted to permit heating of the outdoor air by the use of solar radiation, the system being so arranged as to conduct the outdoor air to the heat pump via the external space. The invention is characterized in that the heat pump system comprises means for regulating the flow of the outdoor air to the external space.

21 Claims, 1 Drawing Sheet

HEAT PUMP SYSTEM

RELATED APPLICATIONS

This application is a nationalization under 35 U.S.C. 371 of PCT/SE2006/001248, filed Nov. 3, 2006 and published as WO 2007/058576 A1, on May 24, 2007, which claimed priority under 35 U.S.C. 119 to Sweden Application Serial No. 0502512-7, filed Nov. 16, 2005; which applications and publication are incorporated herein by reference and made a part hereof.

TECHNICAL FIELD

The invention relates to a heat pump system comprising a heat pump so arranged as to permit the taking up of thermal energy from outdoor air and the giving off of thermal energy to another medium and an external space adapted to permit heating of the outdoor air by the use of solar radiation, the system being so arranged as to conduct the outdoor air to the heat pump via the external space.

BACKGROUND ART

Heating and cooling of buildings, like the production of hot water, are energy-demanding processes, and there are both economic and environmental grounds for reducing the quantity of energy that is utilized for these purposes. The requirement of a building or installation for heating/cooling naturally differs very considerably depending on its design, its use and its location. A residential building in Sweden, for example, normally has a heat requirement during the period between September and April, while a certain cooling requirement may exist during the period between May and August. A well-insulated office in Sweden with a large number of workers and many items of office equipment may instead have a cooling requirement in the daytime during a large part of the year. A building in a more southerly country may have a cooling requirement in the daytime, but a heating requirement at night, and so on.

Over recent decades, a large number of technical products have been produced and developed in order to improve the efficiency of these heating and cooling processes. Heat pumps are one product that has become increasingly common for heating applications in recent years. A heat pump normally comprises a system with an evaporator, a compressor, a condenser and a throttle valve, inside which system a cooling medium is caused to circulate. By evaporating the cooling medium at a lower pressure and condensing it at a higher pressure, thermal energy can be taken up at a lower energy (evaporation heat) and given off at a higher temperature (condensation heat). Heat pumps are able to take up heat, for example from lakes, bore holes ("rock heat"), outdoor air and extract air (that is to say air that is discharged from a building by ventilation), and to give off heat to the indoor air, for example, or for water heating. Heat pumps have also been used for quite a long time for the cooling of buildings in the form of air conditioning installations, in which heat is taken from a building and is discharged to the outside. A heat pump requires electricity in order to drive the compressor, and the price of electricity is accordingly an important parameter for the economic viability of a heat pump. In colder climates, the effect of a heat pump is not normally sufficient to cope with heating unassisted, for which reason buildings are equipped with supplementary heating systems.

In order further to improve the efficiency of heating systems, it is customary to attempt to utilize solar radiation. One example is to cause water to circulate in a solar-heated system in order, by so doing, to obtain a "free" contribution to the production of hot water. Another example is provided in U.S. Pat. No. 4,378,787, according to which an outdoor air heat pump is positioned in a loft space provided with a window, which permits heating of the outdoor air by solar irradiation.

In recent years, development work has been targeted to a great extent at heat pump components and cooling media, among other things with a view to maintaining the efficiency of outdoor air heat pumps at increasingly low outdoor temperatures.

DISCLOSURE OF INVENTION

One object of the present invention is further to improve the efficiency of a heat pump system comprising an outdoor air heat pump or the like.

The invention proposes a heat pump system comprising a heat pump so arranged as to permit the taking up of thermal energy from outdoor air and the giving off of thermal energy to a different medium, together with an external space adapted to permit heating of the outdoor air with the help of solar radiation, the system being so arranged as to conduct the outdoor air to the heat pump via the external space. The invention is characterized in that the heat pump system comprises means for regulating the flow of the outdoor air to the external space. In other words, the system comprises means for increasing or reducing the ventilation/air replacement in the external space, should the need arise. An advantageous effect of this construction is that, by regulating the inward flow of outdoor air, it is possible to regulate the temperature inside the external space, which can be utilized in turn to increase the efficiency of the heat pump. In a first example, the inward flow of outdoor air can be minimized, that is to say the air can be caused to recirculate inside the external space for as long as the temperature in the external space, thanks to irradiated solar energy, remains higher than in the surrounding outdoor air. In most situations, this has a positive influence on the efficiency of the heat pump. In a second example, the inward flow of outdoor air can be maximized when the temperature inside the external space is lower, or is in the process of becoming lower, than the temperature of the ambient air, which can occur when the quantity of irradiated heat is less than the thermal take-off by the heat pump. Thanks to the solution in accordance with the invention, the temperature inside the external space can be prevented from falling below the temperature of the outdoor air. In this way, a situation is avoided in which the efficiency of the heat pump is reduced by the fact that it is obliged to operate with cooled outdoor air, which can occur, for example, with a construction in accordance with U.S. Pat. No. 4,378,787, in which no means are available for controlling the replacement of air in the external space. The thermal energy that is transferred to the second medium in accordance with the invention may be utilized, for example, for heating a domestic hot water system in a neighbouring building or for heating an installation such as a swimming pool.

In a first preferred embodiment of the invention, the heat pump system comprises a first fan so arranged as to generate an inward flow of outdoor air into the external space. This provides the possibility of simple and effective control of the inward flow. The fan is preferably so arranged as to generate an outward flow of air from the external space and, in addition, the system preferably comprises an inlet which permits the inward flow of outdoor air into the external space. In this way, the fan indirectly generates an inward flow of outdoor air into the external space, at the same time as it is provided with increased possibilities to determine how much air will exit from the external space. The fan can very well constitute an integral part of the heat pump, which permits the use of many conventional outdoor air heat pumps.

In a second preferred embodiment of the invention, the flow regulation means is so arranged as to conduct a flow of air that has come into contact with the heat pump and to permit the distribution of the aforementioned air flow between a first outlet, situated inside the external space, and a second outlet, situated outside the external space. Because the air that has come into contact with the heat pump has given off heat to the second medium, this air will normally be cooler than the rest of the air in the external space. The possibility of distributing this air flow in the manner described here provides increased possibilities for regulating the temperature inside the external space. It is possible, for example, for the purpose of avoiding a reduction in the temperature inside the external space, to cause the air in the external space to be recirculated when the air flow is warmer than the outdoor air, and to cause the air flow to be conducted directly to the outside when the air flow is cooler than the outdoor air. The flow regulation means preferably comprises an air duct for conducting the flow of air that has come into contact with the heat pump, and a valve device so arranged as to permit a controllable distribution of the aforementioned air flow between a first outlet duct, which discharges inside the external space, and a second outlet duct, which discharges outside the external space. The first fan is appropriately positioned in connection to the air duct in this case.

In a third preferred embodiment of the invention, the heat pump system is arranged in connection to a building, and the heat pump system in addition includes a connecting duct so arranged as to conduct air between the external space and the building. An advantageous effect of this design is that the air inside the external space can be conducted into the building, and that the air inside the building can be conducted to the external space. Because the combination of the heat pump and the control of the inward air flow to the external space permits the air to be tempered inside the external space, the system in accordance with the invention is capable not only of supplying thermal energy via the heat pump, but also of supplying tempered air to the building. One example is when a need for cooling exists inside the building, for example on a warm summer's day in Sweden, when the heat pump can be allowed to take up heat from the external space and give it off, for example, to a domestic hot water system in the building. The air temperature can then be made to fall in the external space. When this temperature is sufficiently low, and lower than both the outdoor temperature and the indoor temperature inside the building, the system in accordance with the invention offers the possibility of conducting the cooled air from the external space into the building via the connecting duct. A similar possibility is not available with a conventional outdoor air heat pump, which is normally mounted on the wall of a house without even having any space available in which to temper the outdoor air. Another example is when a need for heating exists inside the building. In a corresponding manner, it is possible to let the solar radiation heat up the air inside the external space sufficiently and then to conduct the air directly into the building. The solution in accordance with the invention also offers the possibility of the heat in the extract air being utilized by the heat pump by changing the direction of flow through the connecting duct and by conducting extract air from the building into the external space. The heat pump system preferably includes means for regulating the air flow through the connecting duct, for example a second fan and/or a valve positioned in connection to the connecting duct.

In a fourth preferred embodiment of the invention, the heat pump system comprises an adjustable sun screening device so adapted as to be capable of screening the solar radiation and, by so doing, of limiting the heating of the outdoor air inside the external space. In this way, additional possibilities are provided for regulating the temperature inside the external space.

BRIEF DESCRIPTION OF DRAWINGS

The invention is described below with reference to the following FIGURE.

MODE(S) FOR CARRYING OUT THE INVENTION

Figure 1:
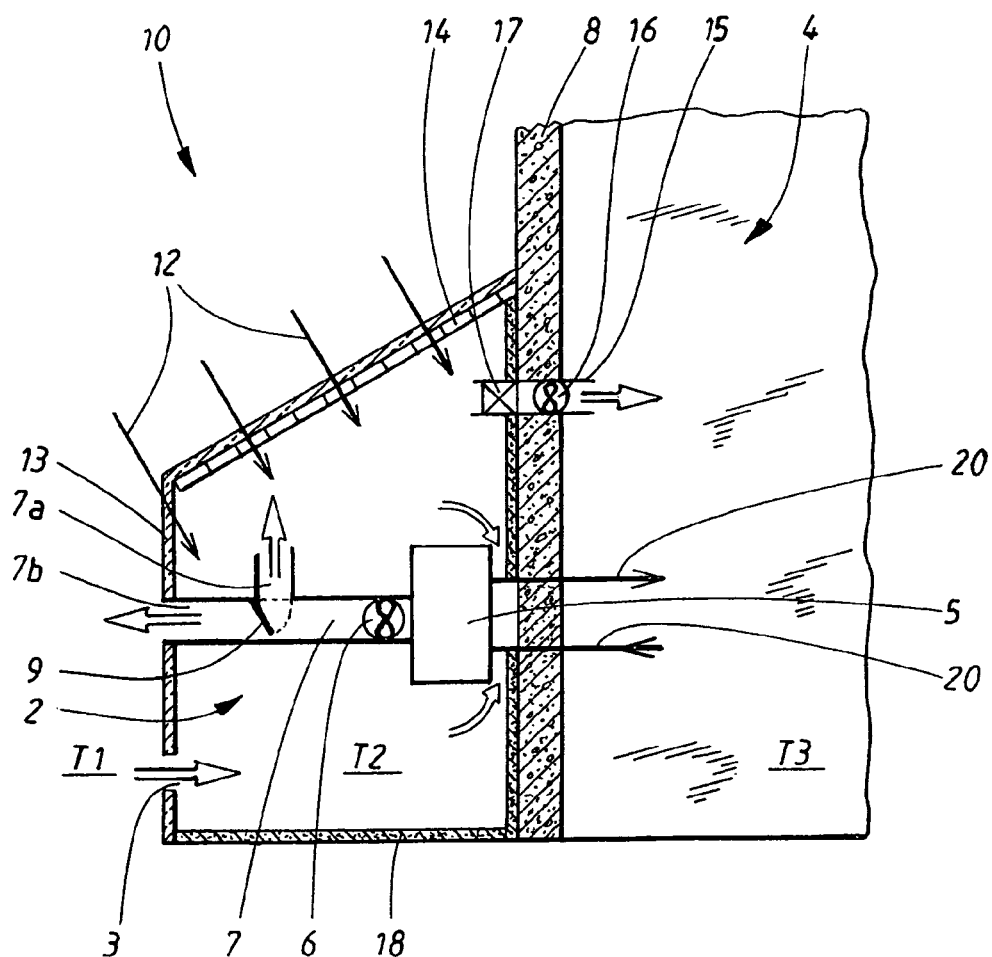
FIG. 1 which depicts schematically a preferred embodiment of the invention.

Depicted schematically in FIG. 1 is a preferred embodiment of a heat pump system 10 according to the invention. A heat pump 5 is so arranged as to take up thermal energy from outdoor air from an external space 2 adapted to permit heating of the outdoor air by the use of solar radiation 12, and to give off thermal energy to a building 4 by heating water. The external space 2 can be in the form of a greenhouse, a glass cupola, a glazed courtyard or some other glazed construction on or in connection to the wall 8 or roof of the building 4. In the conventional way, the heat pump 5 comprises a number of components in the form of an evaporator, a compressor, a condenser, an expansion valve and a cooling medium duct for circulating a cooling medium (which components are not depicted in the FIGURE). The heat pump 5 in turn is arranged in or in conjunction with both the external space 2 and the building 4 in such a way that the air inside the external space 2 comes into contact with the evaporator of the heat pump and that a flow 20 of water in the building 4 comes into contact with the condenser of the heat pump. The heat that is taken up from the outdoor air in the evaporator can then be given up to the flow 20 of water in the condenser. The flow 20 of water can be designated, either directly or indirectly via heat exchange, for use in a waterborne heating system (not depicted) or for heating domestic hot water. The thermal energy taken up in the flow 20 of water naturally does not need to be utilized directly, but can be utilized instead to create a reservoir of hot water for subsequent use. The walls and the roof 13 of the external space 2 consist for the most part of glass in order to permit the solar radiation 12 to heat up air that is present inside the external space 2. The wall 8 and the floor of the external space 2 that are exposed to solar radiation are covered with or produced from a heat-accumulating material 18 such as stone or concrete. The external space 2 is also provided with a sun screening device in the form of blinds 14 for the purpose of enabling the irradiated quantity of solar radiation to be restricted. A first fan 6 is arranged in conjunction with the heat pump 5 for the purpose of forcing air to come into contact with the heat pump 5. The first fan 6 is normally always switched on during operation of the heat pump 5. An air duct 7 is also arranged in conjunction with the first fan 6 and the heat pump 5 in such a way that the air which has passed through the heat pump 5 is conducted into the air duct 7. The air duct 7 branches slightly downstream and forms a first outlet duct 7a, which permits the emission of the air inside the external space 2, and a second outlet duct 7b, which conducts the air out from the external space 2. A valve arrangement in the form of a damper 9 is positioned at the branch for the purpose of regulating the air flow between the first and the second outlet duct 7a, 7b depending on the operation situation. Outdoor air is supplied to or, where appropriate, extracted from the external space 2 via an opening 3 so adapted as to permit the through flow of air when a difference in pressure occurs between the outdoor air and the air inside the external space 2, for example when the air that has come into contact with the heat pump 5 is conducted out from the external space 2 via the second outlet duct 7b. By selecting distribution between the outlet ducts 7a, 7b, it is thus possible to regulate the flow of outdoor air into the external space 2. The heat pump system 10 is also provided with a connecting duct 15 intended, under certain operating situations, to conduct air between the external space 2 and the building 4. The connecting duct 15 is equipped with a valve 17 and a second fan 16 for regulating the air flow between the external space 2 and the building 4. A number of arrows in FIG. 1 indicate a number of different paths via which the air can flow. Notwithstanding what has already been described above, the aforementioned arrows indicate that the air enters the heat pump 5 on the side of the heat pump 5 which faces towards the wall 8 of the house.

The designations T1, T2 and T3 for the following description of operating examples of the heat pump system 10 are included in FIG. 1, where T1 indicates the temperature of the outdoor air, T2 indicates the air temperature inside the external space 2, and T3 indicates the temperature of the indoor air inside the building 4. The temperature T2 inside the external space 2 can vary, of course, between different positions inside the space 2. Unless indicated to the contrary, T2 denotes a kind of mean temperature, for example measured in the vicinity of the inlet of the air flow into the heat pump. One or other of a plurality of previously disclosed types of temperature sensors is appropriately used for determining the temperatures.

The heat pump system 10 can operate in various ways depending on the prevailing conditions. Examples of more significant conditions include the cooling/heating requirement of the building 4, the temperature T1 of the outdoor air, and the current intensity of the solar radiation. In a conventional manner, the building 4 may very well be equipped with supplementary heating and cooling systems. However, the presence of such systems does not in principle affect the function of the heat pump system 10 in accordance with the invention.

Operating Situation A

In a first example of an operating situation, the requirement exists for heating the indoor air inside the building 4. In this case, T1 is normally lower than a desired value for T3. A typical example of such a situation is a dwelling in Sweden during a colder part of the year. In this situation, the sun screening device 14 is maintained in an open position during the day, and the heat pump 5 is allowed to supply as much heat as possible to the flow 20 of water in the building 4. During an initial phase, the valve 17 can be kept closed and the damper 9 can be in a position such that the air is conducted through the first outlet duct 7a, so that in principle no outdoor air is supplied to the external space 2. Depending among other things on the power consumed by the heat pump 5, the volume of the external space 2, the temperature T1 of the outdoor air, the initial temperature T2 inside the external space 2, and the current solar radiation 12, the air temperature T2 inside the external space 2 will rise, remain constant or fall.

If the temperature T2 is higher than T3, and in particular if T2 is also rising, the valve 17 can be opened so that heated air can flow through the connecting duct 15 from the external space 2 into the building 4. The second fan 16 is used appropriately to increase the flow. The valve 17 and the fan 16 can be closed, for example once the temperature T2 has fallen to the same level as T3. As an alternative, or in addition to causing the heated air to be supplied to the building 4 through the connecting duct 15, the damper 9 can be set to a position such that the air flows at least partially through the second outlet duct 7b. This measure permits air replacement inside the external space 2, which in turn permits the temperature T2 to be lowered (provided that T1 is lower than T2). This can be appropriate in order to cause the heat pump 5 to operate within a certain temperature range or to maintain the temperature inside the external space 2 below a certain temperature for some other reason, for example if the external space 2 contains temperature-sensitive plants.

If the temperature T2 is lower than T1, or when T2 falls to a value below T1, the position of the damper 9 is varied so that the air which exits from the heat pump 5 is conducted out via the second outlet duct 7b. Because the air that has come into contact with the heat pump 5 has given off heat to the flow 20 of water, this air will be cooler than T2. As a result of this measure, outdoor air at a temperature T1 will flow in through the opening 3 and will cause T2 to increase, unless other conditions, such as solar irradiation and power consumption, are the same. With sufficiently large air replacement, an operating situation will be obtained in which T2 will be identical with T1. With a good air replacement inside the external space 2, the temperature T2 inside the external space 2 will fall to a value no lower than that of the outdoor temperature T1. If this minimum temperature is lower than desirable, having regard for the efficiency of the heat pump 5, it may be appropriate to reduce the effect of the heat pump 5 slightly so that the air is able to be heated up sufficiently by the solar radiation. A situation of this kind may typically prevail on a cold and sunny winter's day.

In one variant of the invention, a temperature T4 is also determined in the (cooler) air flow as it exits from the heat pump 5, for example in a position far upstream in the air duct 7. Because the air which exits from the heat pump 5 has given up heat to the flow 20 of water, T4 will normally be lower than T2. In order to keep T2 as high as possible, the system 10 can be controlled in such way that, when T4 is lower than T1, but where T2 may be higher than T1, the position of the damper 9 is varied so that the air is conducted out from the external space 2 via the second outlet duct 7b. In this way, the air supplied to the external space 2 is warmer than if the air were to be circulated via the first outlet duct 7a, and it is possible in this way, for example, to avoid the situation in which T2 falls below T1.

The sun screening device 14 is appropriately set to the closed position when the level of solar radiation is negligible, that is to say at night and on any very dark days. The thermal radiation from the external space 2 is then reduced. A further temperature-increasing effect can be achieved by ensuring that the external space 2 is thermally well insulated. Any leakage of heat from the compressor of the heat pump 5, the building 4 or other sources that is given off to the external space 2 can then be utilized more effectively. If it is wished instead to cool the air inside the external space 2, see below, the heat from the compressor of the heat pump 5 can be conducted out appropriately to a point outside the external space 2.

Operating Situation B

In a second example of an operating situation, the requirement exists for cooling the indoor air inside the building 4. In this case, T1 is normally higher than a desired value for T3. At the same time, there is a need to heat the flow 20 of water for the production of domestic hot water. A typical example of such a situation is a dwelling in Sweden during the summer, in particular during the daytime, although occasionally also at night. In this situation, the object is to cause the heat pump 5 to generate cold air inside the external space 2 for cooling the building 4, at the same time as it continues to heat the flow 20 of water as before. The sun screening device 14 can be maintained in a closed position, at least during the day, in order to minimize the irradiation 12 from the sun. The degree of opening of the sun screening device 14 can be regulated depending on the intensity of the solar radiation 12 and the removal of heat by the heat pump 5. The heat pump 5 is also allowed to supply as much heat as possible to the flow 20 of water in the building 4. During an initial phase, the damper 9 is set to a position such that the air is conducted through the first outlet duct 7a at the same time as the valve 17 is kept closed, so that in principle no air replacement takes place inside the external space 2. Depending on the take-up of thermal energy from the air inside the external space 2 by the heat pump 5, the temperature T2 will fall successively. Once the temperature T2 is below both T1 and T3, the building 4 can be cooled by conducting air from the external space 2 to the building 4 via the connecting duct 15 by opening the valve 17. The second fan 16 is preferably used to increase the flow of supply air. Outdoor air will then flow into the external space 2 via the opening 3. Depending, among other things, on the temperature of the outdoor air T1, the take-up of heat and the actual level of solar radiation, the air temperature T2 inside the external space 2 will now rise, remain constant or fall further. In order to find a stable operating position in this situation, it is possible, for example, to regulate the degree of opening of the valve 17 and the sun screening device 14, and/or the effect of the second fan 16. If the temperature T2 inside the external space 2 continues to rise, it may be necessary, in order to lower T2, to close the valve 17 and the sun screening device 14 entirely.

In another variant of the invention, the heat pump system 10 can be provided with an additional duct (not depicted) adapted to conduct air that has come into contact with the heat pump 5 directly to the connecting duct 15. As mentioned above, this air is normally cooler than the temperature T2. The air flow through the aforementioned additional duct is appropriately dehumidified before entering the building 4. In this variant, too, it is appropriate to determine the temperature T4 in the (cooler) air flow as it exits from the heat pump 5, for example in a position far upstream in the air duct 7, in order to be able to determine how to control the system 10. With this variant of the invention, it is possible to produce a flow of air more rapidly at a sufficiently low temperature to cool the building 4. For example, this additional duct may consist of a branch in the first outlet duct 7a, in conjunction with which an additional damper (not depicted) is appropriately arranged for distribution of the air flow between the first outlet duct 7a and the aforementioned additional duct.

In one example of this second operating situation, the outdoor air temperature T1=25° C., the temperature of the outer space 2 T2=25° C., and the temperature of the indoor air T3=24° C. during an initial phase. The desired indoor temperature, that is to say the desired value of T3, is 21° C. According to what has been described above, T2 will fall successively when the heat pump system 10 is operating. Once T2 has been reduced, for example to 23° C., it is possible to cause the air to be conducted into the building 4 via the connecting duct 15. This can continue for as long as T2 is lower than T3, and T3 is higher than 21° C. Alternatively, conducting air into the building via the connecting duct 15 can be delayed until T2 has reached 20° C., for example.

The external space 2 can be designed in many different ways. The largest part, or at least a large part, of its walls and/or its roof is preferably made of glass or some other material that is transparent for the solar radiation. The expression "transparent" is used in this context to denote that the material is sufficiently transparent for a sufficiently large part of the wavelength spectrum of the solar radiation, in order for air or other material beyond the transparent material to be heated up. Conventional window glass, for example, is suitable for this purpose. Plastic materials also work well on condition that they are sufficiently resistant. Use is preferably made of so-called energy-saving glass, which, to a greater extent than conventional window glass, reflects long-wave thermal radiation back into the external space 2 and admits the more short-wave solar thermal energy. The transparent parts should be oriented at an appropriate angle towards the sky, so that effective irradiation by solar energy is achieved. Furthermore, the transparent component parts should, of course, exhibit a principally southerly aspect in the northern hemisphere. In addition to what has already been stated above, the external space 2 may consist of (parts of) a fully glazed facade. For example, a quite large office building may be provided with a plurality of external spaces 2 arranged inside a fully glazed south-facing facade. If chiefly the cooling function (operating situation B) is of interest, it is normally sufficient if the transparent parts are vertically oriented. The external space 2 can also contain means for increasing the absorption of the solar radiation, such as black painted surfaces and heat-accumulating materials 18, for example stone and concrete. The external space can also contain means such as fans and baffle plates to cause the air to circulate and to be conducted within the external space 2. Such means make it possible to achieve a uniform temperature distribution inside the external space 2. As previously mentioned, the system 10 is arranged in such a way that, for the purpose of keeping the temperature T2 as high as possible, air that has come into contact with the heat pump 5 can be conducted directly outwards via the second outlet duct 7b in order to prevent it from becoming mixed with the other, normally rather warmer, air inside the external space 2. It is also possible, with a view to maintaining the temperature T2 as low as possible, to design the system 10 so that the air that is present at the highest point inside the external space 2 can be conducted out, which air is the warmest under normal circumstances. The external space 2 can also contain dehumidifiers, air filters, etc., for treatment of the air. The external space 2 is preferably also so arranged as to exhibit good thermal insulation so that the temperature T2 inside the external space 2 is determined to the greatest possible degree by irradiated solar energy, air replacement (via ducts 7b, 15 and the opening 3) and the heat taken up by the heat pump 5. Better use is made of the energy in this way, and this also means that the heating system 10 can be controlled more effectively. The external space 2 is primarily intended to function as a space for air tempering, i.e. it is not intended to function as a room of a building designed for (long-term) human occupation.

The preferred volume to be exhibited by the external space 2 depends on a number of factors, including the design of the external space 2, the effect of the heat pump 5, the climatic zone in which the building is located, and the heating/cooling requirement of the building. For a detached house of normal size situated in Sweden and a conventional outdoor air heating pump, the function will be provided effectively with an ordinary greenhouse, that is to say a structure in the order of 30 m$^3$. Larger or smaller volumes are also conceivable, however.

The heat pump system 10 according to the invention functions excellently with an outdoor air heat pump of the conventional type, for example having regard for its effect and appropriate temperature range. Such heat pumps are also commonly equipped with a built-in fan, which fan can function as the first fan 6 indicated in FIG. 1.

In order to regulate the heat pump system 10 according to the invention, a number of parameters can be of interest depending on how advanced a control system it is wished to have: outdoor temperature T1; air temperature inside the external space T2; air temperature inside the building T3; temperature of the air that has come into contact with the heat pump T4; power consumption of the heat pump 5; intensity of solar irradiation 12; opening position of dampers/valves 9, 17 and sun screening device 14; power position of the fans 6, 16, and power requirement for the flow 20 of water. The air pressure outdoors, inside the external space 2, and inside the building 4 can also be utilized for regulation, in particular if the opening 3 is equipped with a controllable valve. The system 10 is preferably equipped with a number of temperature, radiation and position sensors, etc., to enable desired parameters to be determined, and it is also equipped with actuating devices for changing settings. It is naturally possible for a person skilled in the art, in possession of the information provided in this text, to automate the regulation of the heat pump system 10 in a similar fashion to conventional heating or ventilation systems. The regulation of the heat pump system 10 is preferably integrated with other/existing ventilation and heating systems in the building 4.

The system also offers the possibility of conducting air from the building 4 into the external space 2 via the connecting duct 15, for example by operating the second fan 16 in reverse (which fan 16 then assumes the function of an extract air fan instead of a supply air fan). This can be appropriate, for example, in order to take advantage of the heat present in the air inside the building 4.

The invention is not restricted to the embodiments described above, but may be modified within the scope of the following patent claims. At least certain of the advantages of the invention can be utilized, for example, even if the air that has come into contact with the heat pump 5 cannot be conducted out directly, which, in the example described according to FIG. 1, is achieved with the help of the first fan 6 and the air duct 7 together with its second outlet duct 7*b*. The reason is to achieve good regulation of the air replacement in the external space 2. Instead of the air duct 7 and its outlet 7*a*, 7*b*, it would be possible to position an additional controllable fan in an additional opening in order, in this way, to permit controllable air replacement in the external space 2. In a variant of this kind, the air that has come into contact with the heat pump 5 is thus mixed with other air inside the external space 2. However, a considerable advantage of the invention in accordance with the embodiment described in FIG. 1, as mentioned above, is that it permits more effective regulation of the temperature through the ability to conduct the cooler air that has come into contact with the heat pump 5 directly out, or directly to the connecting duct 15, without first being mixed.

Fans, dampers, valves, ducts and openings can, of course, be arranged in an alternative manner to that depicted schematically in FIG. 1. For example, the damper 9 can be replaced with a valve in each outlet duct 7*a*, 7*b*. The ducts 7, 7*a*, 7*b* can also be positioned outside the external space 2; an important consideration, of course, is the positioning of its inlet and outlet. The opening 3 can have alternative positions, of course. The size of the opening 3 is not critical, although it should be sufficiently large not to prevent air from flowing in, or out, from the external space 2 when this is desirable, and sufficiently small to minimize any undesired air flow. A plurality of openings can naturally be used. In addition, the opening 3 can be provided both with a valve and with a fan, if desired.

The building 4 can be a residential building or an office building or premises of some other kind. Nor is it necessary for the flow 20 to consist of water; it can be another medium which takes up the thermal energy from the heat pump 5. It is also not necessary, of course, for the whole of the thermal energy to be taken up by the building 4; for example, one or a plurality of neighbouring buildings or installations, such as swimming pools, heated pavements or roads, agricultural installations or industrial processes, can avail themselves of this thermal energy. It is accordingly not necessary for the heat pump system 10 to be arranged in conjunction with a building; for example, the system 10 with its associated external space 2 can constitute a separate unit arranged in conjunction with a swimming pool, for example. In order to utilize the advantageous cooling function via the connecting duct 15, it is nevertheless particularly favourable for the system 10 to be arranged in conjunction with a building which experiences a cooling requirement, at least from time to time.

As far as concerns the sun screening device 14, this can consist of sheets that are drawn back and forth, or up and down, for example, as an alternative to blinds. It is also not necessary to position the sun screening device 14 inside the external space 2; from the point of view of screening, it may be advantageous to position it externally, for example in the form of an arrangement resembling an awning. On the other hand, an externally positioned sun screening device 14 is more exposed to the effects of the wind and weather, which can influence its function. The sun screening device 14 is preferably motor-driven in order to facilitate its automatic regulation.

What is claimed is:

1. A heat pump system comprising:
    an external space having a quantity of outside air inside the external space, the external space adapted to permit heating of the outside air within the external space by the use of solar radiation, and
    a heat pump comprising an evaporator, a condenser and a compressor, the heat pump so arranged as to permit the taking up of thermal energy from the outdoor air and the giving off of thermal energy to another medium,
    the system being so arranged as to conduct the outdoor air to the heat pump via the external space,
    wherein the heat pump system comprises means for regulating the flow of the outdoor air to the external space.

2. The heat pump system according to claim 1, wherein the system comprises a first fan so arranged as to generate a flow of the outdoor air into the external space.

3. The heat pump system according to claim 2, wherein the first fan is to generate an outward flow of air from the external space, and wherein the system comprises an inlet to permit inward flow of air into the external space.

4. The heat pump system according to claim 3, the first fan constitutes an integral part of the heat pump.

5. The heat pump system according to claim 4, wherein the flow control means is so arranged as to conduct a flow of air that has come into contact with the heat pump and to permit the distribution of the aforementioned air flow between a first outlet, situated inside the external space, and a second outlet, situated outside the external space.

6. The heat pump system according to claim 5, wherein the flow control means comprises an air duct for conducting the flow of air that has come into contact with the heat pump, and a valve device so arranged as to permit a controllable distribution of the aforementioned air flow between a first outlet duct, which discharges inside the external space, and a second outlet duct, which discharges outside the external space.

7. The heat pump system according to claim 6, wherein the first fan is positioned in connection to the air duct.

8. The heat pump system according to claim 7, wherein the heat pump system is arranged in connection to a building, and wherein the heat pump system includes a connecting duct so arranged as to conduct air between the external space and the building.

9. The heat pump system according to claim 8, wherein the heat pump system comprises means for regulating the air flow through the connecting duct.

10. The heat pump system according to claim 9, wherein the external space includes at least one of walls and a roof which at least in part consist of a material that is transparent to solar radiation.

11. The heat pump system, according to claim 10 comprises an adjustable sun screening device so adapted as to be capable of screening the solar radiation and, by so doing, of limiting the heating of the outdoor air in the external space.

12. The heat pump system according to claim 11, wherein the heat pump is so arranged as to give off thermal energy directly or indirectly to one or a plurality of water systems in a building, an installation, or a process.

13. The heat pump system according to claim 2, wherein the first fan constitutes an integral part of the heat pump.

14. The heat pump system according to claim 1, wherein the flow control means is to conduct a flow of air that has come into contact with the heat pump and to permit the distribution of the aforementioned air flow between a first outlet, situated inside the external space, and a second outlet, situated outside the external space.

15. The heat pump system according to claim 14, wherein the flow control means comprises an air duct for conducting the flow of air that has come into contact with the heat pump, and a valve device so arranged as to permit a controllable distribution of the aforementioned air flow between a first outlet duct, which discharges inside the external space, and a second outlet duct, which discharges outside the external space.

16. The heat pump system according to claim 15, wherein the first fan is positioned in connection to the air duct.

17. The heat pump system according to claim 3, wherein the heat pump system is arranged in connection to a building, and wherein the heat pump system includes a connecting duct so arranged as to conduct air between the external space and the building.

18. The heat pump system according to claim 17, wherein the heat pump system comprises a regulator to regulate the air flow through the connecting duct.

19. The heat pump system according to claim 18, wherein the external space includes at least one of walls and a roof which at least in part consist of a material that is transparent to solar radiation.

20. A heat pump system, comprising:
a heat pump including an evaporator, a compressor, and a condenser, the heat pump so arranged as to permit the taking up of thermal energy from outdoor air and the giving off of thermal energy to another medium,
an external space adapted to permit heating of the outdoor air by the use of solar radiation,
an inlet conduct the outdoor air to the heat pump via the external space, and a flow regulator connected to the inlet to regulate the flow of the outdoor air to the external space.

21. A heat pump system, comprising:
an external space having a quantity of outside air inside the external space, the external space adapted to permit heating of the outside air within the external space by the use of solar radiation, and
a heat pump comprising an evaporator, a condenser and a compressor, the heat pump so arranged as to permit the taking up of thermal energy from the outdoor air and the giving off of thermal energy to another medium,
the system being so arranged as to conduct the outdoor air to the heat pump via the external space,
wherein the heat pump system comprises means for regulating the flow of the outdoor air to the external space.
wherein the flow control means is to conduct a flow of air that has come into contact with the heat pump and to permit the controllable distribution of the aforementioned air flow between a first outlet, situated inside the external space, and a second outlet, situated outside the external space.

* * * * *